238. RAILWAYS, SURFACE TRACK.

164

C. F. GAILOR.

WELDED RAIL JOINT.

APPLICATION FILED APR. 14, 1916.

Reissued May 23, 1916. 14,137.

WITNESSES:

George DuBon

Elmer Stillgoing

INVENTOR

CHESTER F. GAILOR

BY

Bonsall & Schrenk

ATTORNEYS

THE COLUMBIA PLANOGRAPH CO., WASHINGTON, D. C.

UNITED STATES PATENT OFFICE.

CHESTER F. GAILOR, OF NEW YORK, N. Y., ASSIGNOR TO ACCUMULATOREN-FABRIK AKTIEN-GESELLSCHAFT, OF BERLIN, GERMANY, A CORPORATION OF GERMANY.

WELDED RAIL-JOINT.

14,137. Specification of Reissued Letters Patent. Reissued May 23, 1916.

Original No. 930,066, dated August 3, 1909, Serial No. 419,147. Application for reissue filed April 14, 1916. Serial No. 91,259.

*To all whom it may concern:*

Be it known that I, CHESTER F. GAILOR, a citizen of the United States, residing at New York city, county of New York, and State of New York, have invented certain new and useful Improvements in Welded Rail-Joints, of which the following is a specification.

This invention relates to improvements in welded rail-joints particularly adapted to electric railway uses.

The objects of the invention are to secure permanent electric conductivity from one rail to another; to evenly distribute the shock of the moving car throughout the joint between two abutting rails; to overcome all possibility of wear between the plates and rails; to prevent atmospheric changes from taking place between the plates and rails; to provide a form of joint which can be supported or suspended as desired to accommodate the same to various forms or paving construction; and to enable the joint to resist the forces of expansion and contraction, due to changes in temperature.

The invention consists in drawing the abutting ends of the rails into close contact with each other by bolting or riveting to the sides of the rails, splicing-plates, and afterward welding the edges of such plates to the rails, the edges on one end of each plate to one rail, and the edges on the other end of each plate to the other rail, as will be hereinafter more fully described and subsequently pointed out in the claims.

Figure 2:
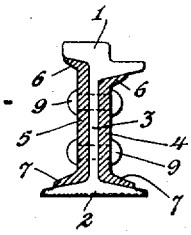
Figure 1:
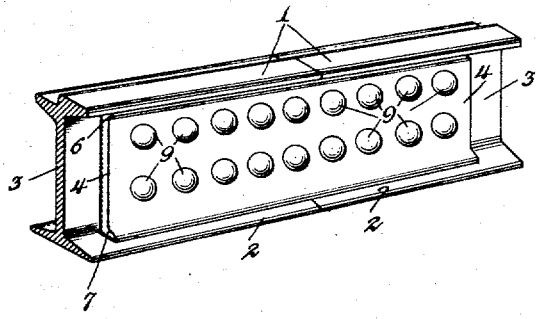

Referring to the drawings: Figure 1 is a view in perspective showing the completed joint. Fig. 2 represents a cross-section taken through the joint at the ends of the abutting rails.

The rails are provided with the head, 1, and base, 2, united by the vertical web 3.

The splicing-plates 4 and 5, are each provided with longitudinal edge-flanges, the upper flanges, 6, adapted to engage with the under side of the head, the lower flanges, 7, adapted to engage with the upper surface of the base. The plates are first secured to the rails, so as to lap the joint formed by the abutting ends of the rails, by means of the bolts or rivets, 9, inserted through apertures in the plates and in the web of the rails. These holes are carefully bored to register with each other, when the abutting ends of the rails are tight together. When desired, the holes are reamed while the plates are in place, thereby insuring a perfect fit, and preventing any separation or other displacement of the joint by contraction and expansion. When desired, the rivets are driven hot, and calculated to stand all stresses due to variations of temperature and traffic. The plates are then welded to the rails around their edges. When the plates are welded throughout their upper and lower edges to the rails, the edges on one end of the plates to one rail, and the edges on the other end of the plates to the other rail, the joint is materially and sufficiently strengthened to resist all shocks and stresses which are distributed throughout the entire length of the plates, and a sufficient electric bond between the abutting rails is established.

As a means for preventing accumulation of moisture between the plates and rails, which sets up oxidation of the parts, and eventually causes them to deteriorate and become worthless, the end edges of the plates are also welded to the rails, which prevents the accumulation of moisture between the plates and rails. When desired, the edges of the abutting rails may also be welded together where they are not covered by the plates. It will be sufficient in most cases to weld the abutting edges of the base of the rails only, between the two plates, as the base of the rails is buried, while the head of the rails is above the surface of the ground.

It is obvious that any known system of welding may be employed.

In using the words "bolting" or "bolted" in connection with the splicing-plates and rails, in the specification and claims, it is intended to include "riveting" or "riveted", as well as any other equivalent mechanism for mechanically connecting the ends of the rails in an abutting position.

By welding the side and end edges of a lapping splicing plate to the abutting rails, a maximum rigidity is secured, with a minimum heating and expansion of the rails, and moisture is excluded from between the unwelded portions of the plate and rails.

What I claim as new and desire to secure by Letters Patent is:

1. A rail joint comprising alined and end abutting rails, and a pair of lapping plates bolted to opposite sides of said rails so as to secure them together, the upper and lower edges of said plates being also welded to the rails.

2. A rail joint comprising end abutting rails, and a lapping plate against both of said rails, said plate having its edges along both ends and along both sides welded to the rails, the edges of one end to one rail and the edges of the other end to the other rail, so that a maximum rigidity, with minimum heat expansion, is secured, and moisture excluded from the space between the unwelded portions of the plates and rails.

3. A rail joint comprising end abutting rails, said rails being provided with a head and base united by a vertical web, and splicing plates having longitudinal edge flanges, said edge flanges being engaged with and welded to the aforesaid head and base respectively, the edges of one end of the plate to one rail and the edges of the other end of the plate to the other rail.

4. A rail joint comprising end abutting rails, said rails being provided with a head and base united by a vertical web, and splicing plates bolted to opposite sides of said rails, said plates having each an upper edge flange engaged with and welded to the under side of the head of each rail, and a lower edge flange engaged with and welded to the upper surface of each rail base.

5. A rail joint comprising end abutting rails, said rails being provided with a head and base united by a vertical web, and splicing plates riveted to opposite sides of said rails, said plates having each an upper edge flange engaged with and welded to the under side of the head of each rail, and a lower edge flange engaged with and welded to the upper surface of each rail base, the end edges of each plate being, further, welded to the head, web and base of the rails.

6. A rail joint comprising end abutting rails, and a pair of splicing plates, one plate on each side of said rails, the upper and lower edges of each plate being welded to said rails, the edges of one end of the plate to one rail and the edges of the other end of the plate to the other rail, the abutting edges of the bases of the rails, from the splicing plate on one side of the rails to the splicing plate on the other side of the rails, being also welded.

7. A rail joint comprising end abutting rails, and a pair of splicing plates having longitudinal edge flanges and riveted to the rails, and welded, their upper edge flanges to the heads of the rails, and their lower edge flanges to the bases of the rails.

8. A rail joint comprising end abutting rails, a pair of splicing plates, severally welded throughout all of their edges to the rails, and a welded union of the edges of the abutting bases of the rails extending from a splicing plate on one side of the rails to the splicing plate on the opposite side of the rails.

In testimony whereof I have hereunto set my hand.

CHESTER F. GAILOR.

Copies of this patent may be obtained for five cents each, by addressing the "Commissioner of Patents, Washington, D. C."